(12) United States Patent
Parry

(10) Patent No.: US 7,277,538 B2
(45) Date of Patent: Oct. 2, 2007

(54) DISTORTION COMPENSATION IN AN ACOUSTIC ECHO CANCELER

(75) Inventor: James H. Parry, Los Gatos, CA (US)

(73) Assignee: Tandberg Telecom AS, Lysaker (NO)

( * ) Notice: Subject to any disclaimer, the term of this patent is extended or adjusted under 35 U.S.C. 154(b) by 60 days.

(21) Appl. No.: 11/243,236

(22) Filed: Oct. 4, 2005

(65) Prior Publication Data

US 2006/0034448 A1    Feb. 16, 2006

Related U.S. Application Data

(63) Continuation of application No. 09/699,188, filed on Oct. 27, 2000, now abandoned.

(51) Int. Cl.
*H04M 9/08* (2006.01)

(52) U.S. Cl. .............. 379/406.01; 379/406.06

(58) Field of Classification Search ........... 379/406.01, 379/406.09, 406.1, 406.16, 406.06
See application file for complete search history.

(56) References Cited

U.S. PATENT DOCUMENTS

| | | | |
|---|---|---|---|
| 4,709,391 A | * | 11/1987 | Kaizer et al. ................. 381/98 |
| 4,965,822 A | | 10/1990 | Williams |
| 5,526,426 A | * | 6/1996 | McLaughlin ........... 379/406.13 |
| 5,680,450 A | * | 10/1997 | Dent et al. ............. 379/406.08 |
| 6,650,701 B1 | | 11/2003 | Hsiang et al. | |

OTHER PUBLICATIONS

U.S. Appl. No. 11/124,772, filed May 9, 2005, Harry et al.

* cited by examiner

*Primary Examiner*—Curtis Kuntz
*Assistant Examiner*—Alexander Jamal
(74) *Attorney, Agent, or Firm*—Oblon, Spivak, McClelland, Maier & Neustadt, P.C.

(57) ABSTRACT

An audio communications system has an acoustic echo cancellation (AEC) module. The AEC module receives a digital signal sent to a loudspeaker and a digital signal received from a microphone. The signal received from the microphone contains an echo of the signal played through the loudspeaker. The loudspeaker signal is processed by an audio generation module (AGM) that models substantially nonlinear distortions that can occur while producing the signal played through the loudspeaker. The AGM includes a modeling path comprised of one or more distortion modules. Each distortion module receives digital samples as input, modifies the samples to model a form of distortion, and outputs the modified samples. The output of the AGM is provided to an acoustic echo estimation (AEE) module that uses adaptive algorithms to compensate for substantially linear changes in the echo characteristics of the environment in which the loudspeaker and microphone are located.

4 Claims, 3 Drawing Sheets

DISTORTION COMPENSATION IN AN ACOUSTIC ECHO CANCELER

CROSS-REFERENCE TO RELATED APPLICATION

This application is a continuation of U.S. Ser. No. 09/699,188, filed on Oct. 27, 2000, now abandoned entitled DISTORTION COMPENSATION IN AN ACOUSTIC ECHO CANCELER, by inventor James H. Parry, currently pending.

BACKGROUND OF THE INVENTION

Field of Invention

This invention pertains in general to telephony and televideo conferencing and in particular to performing acoustic echo cancellation on potentially distorted audio signals.

BACKGROUND OF INVENTION

Two-way audio communications systems, such as speakerphones and video communications systems having audio capabilities, utilize both a microphone and a loudspeaker. The microphone transmits speech and other sounds from the local terminal to remote terminals while the loudspeaker emits sounds received from remote terminals. In a typical hands-free system, the loudspeaker and microphone are located in close proximity and sounds produced by the loudspeaker are picked up by the microphone. Without signal processing, therefore, a feedback loop is easily created between the loudspeaker and microphone. This feedback can cause the loudspeaker to emit an undesirable "howling" noise and cause the remote terminals to hear echoes.

One simple technique for eliminating feedback is to provide half-duplex switching where only the microphone or the loudspeaker is active at any given instant. In a typical half-duplex system, the loudspeaker is active until a sound is detected at the microphone. Then, the loudspeaker becomes inactive and the microphone becomes active for the duration of the sound. Half-duplex systems have many inherent problems, not the least of which is that a slight noise may unintentionally cause the loudspeaker to cut out. As a result, it is often difficult to conduct a normal conversation with a system using half-duplex switching.

More sophisticated audio communications systems use acoustic echo cancellation (AEC) to reduce echoes and eliminate howling. An AEC system typically utilizes a sample-by-sample copy of the signal going to the loudspeaker as the basis for an estimate of the echo returning through the microphone, as taught in U.S. Pat. No. 4,965,822, entitled FULL DUPLEX SPEAKERPHONE, which issued on Oct. 23, 1990 and is incorporated by reference herein. This estimated echo is subtracted on a sample-by-sample basis in an attempt to separate out only that portion of the microphone signal due to sounds coming from sources other than the speaker. An adaptive AEC uses a filter having slowly adjusted weights to form the echo estimate in an effort to more accurately subtract the echo from the returned audio signal. Subsequent conditioning performed on the output of the AEC may include automatic gain control (AGC) and perceived noise reduction.

A problem with the above approach is that the loudspeakers do not produce sound pressure signals that are exactly proportional to the driving voltage (or current). Likewise, microphones are imperfect in an analogous sense. There may also be other sources of distortion within the sound system, such as amplifiers, analog-to-digital (A/D) and digital-to-analog (D/A) converters, and perhaps even the user's environment. Existing AEC systems do not accurately remove the nonlinear components of the returned signal due to these sources of potential distortion. As a result, a badly distorted form of the echo can pass through the echo cancellation process. Another undesirable effect of these introduced distortions is that the adaptation of the AEC parameters is degraded, leading to a greater perceived echo.

One potential solution to the problem of degraded AEC adaptation is to use a reduced adaptation rate during periods of very loud sound output. This technique is used, for example, in U.S. Pat. No. 6,650,701, entitled APPARATUS AND METHOD FOR CONTROLLING AN ACOUSTIC ECHO CANCELER, which issued on Nov. 18, 2003, and incorporated by reference herein. However, reducing the adaptation rate has the undesirable effect of slowing the system's response to a changing acoustic environment such as when users are in motion and/or the room temperature fluctuates.

Another potential solution is to use higher quality loudspeakers and other components. This solution, however, carries with it considerable expense and places severe limitations on the designs of the equipment. High-quality loudspeakers are typically large and heavy and generate strong external magnetic fields. Often, the audio communications system is integrated into another sound system, such as the audio subsystem of a laptop computer, where a high-quality loudspeaker cannot be used.

Therefore, there is a need for a technique for more accurately estimating the echo when performing acoustic echo cancellation. There is also a need for a technique for more accurately adapting the estimated echo in response to changing acoustic characteristics.

DISCLOSURE OF THE INVENTION

The above needs are met by using modules to estimate the nonlinear distortions in the audio signal returned from the microphone that were introduced by the loudspeaker, microphone, and related components.

A typical audio communications system has a plurality of terminals coupled to a switch. The terminals can include, for example, dedicated speakerphones, desktop handsets with or without speakerphone capabilities, cellular phones, and/or personal computer (PC) systems with audio capabilities. The switch may be dedicated to audio communications, as is a private branch exchange (PBX), or distributed and multi-functional, as is an Internet server.

Each terminal preferably includes a microphone and a loudspeaker. An amplifier amplifies the electrical signals produced by the microphone and provides its output to an A/D converter. The A/D converter outputs equivalent digital samples. The loudspeaker is driven by another amplifier which, in turn, is driven by the output of a D/A converter. The D/A converter receives digital samples representing the sound pressure waves to be produced by the loudspeaker.

In order to cancel echoes of the loudspeaker picked up by the microphone, the audio communications system has an acoustic echo cancellation (AEC) module. The AEC module can be located in the terminal or elsewhere in the audio communications system. U.S. patent application Ser. No. 11/124,772, entitled COMMUNICATIONS SYSTEM AND METHOD UTILIZING CENTRALIZED SIGNAL PROCESSING, filed on May 9, 2005, and incorporated by reference herein, describes potential locations of the AEC module. The AEC module preferably receives the digital signal sent to the loudspeaker and the digital signal received from the microphone.

The digital loudspeaker signal is processed by an audio generation module (AGM) to model the substantially nonlinear distortions that can occur during the process of playing the audio signal at the loudspeaker. The AGM includes a modeling path comprised of one or more distortion modules. Each distortion module receives digital samples as input, modifies the samples to model a form of distortion, and outputs the modified samples. A distortion module can be adaptive or it can be partly or wholly pre-established. Preferably, the AGM can add or remove distortion modules from the modeling path at any time in response to characteristics of the digital samples or under direction from other modules. Distortions that can be modeled by the distortion modules in the AGM modeling path include, for example, amplifier clipping, loudspeaker voice coil displacement, harmonic distortion introduced by the loudspeaker, and hysterisis in an iron-core inductor.

The AGM outputs digital sample values to an acoustic echo estimation (AEE) module. The AEE module preferably uses known adaptive algorithms to adapt the digital samples to compensate for substantially linear changes in the echo characteristics of the environment in which the loudspeaker and microphone are located. For example, the AEE module can modify the digital samples to account for changes in echo attenuation due to relocation of people in the vicinity of the microphone.

The output of the AEE module is received by an audio sensing module (ASM). The ASM performs a function similar to the AGM, except that the ASM models substantially nonlinear distortions that occur while sensing the audio signal. Accordingly, the ASM models distortions such as microphone 116 centerclipping, amplifier zero crossing distortion, saturation in either the microphone or the amplifier, and distortions introduced by the A/D converter. The output of the ASM represents the estimate of the echo of the loudspeaker signal in the signal received from the microphone.

The digital samples returned from the microphone and the output of the ASM are received by an adder module. The adder module subtracts the estimated echo received from the ASM from the samples returned from the microphone, thereby removing at least part of the estimated echo of the loudspeaker from the microphone signal.

DETAILED DESCRIPTION OF THE PREFERRED EMBODIMENTS

Figure 1:
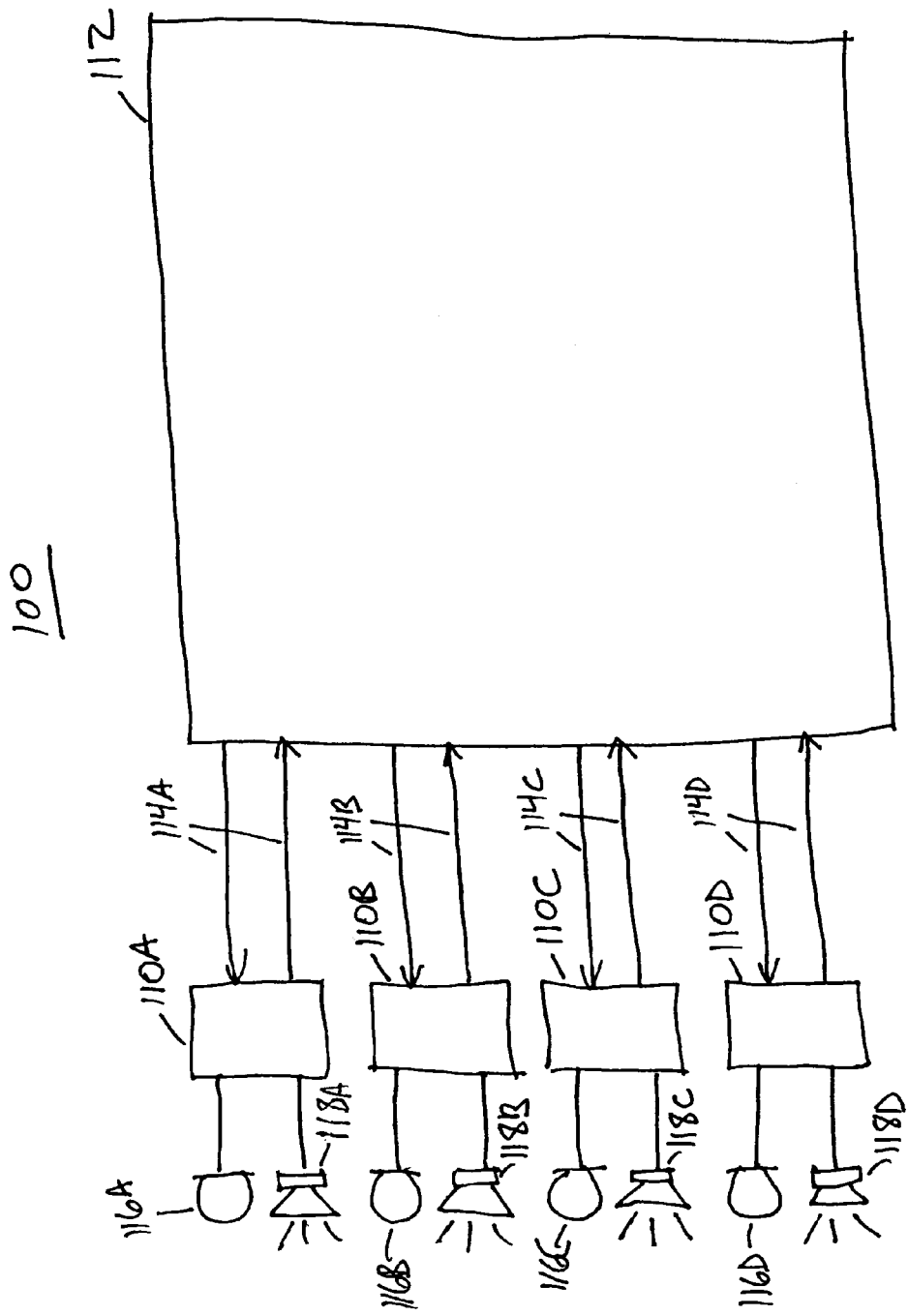
FIG. 1 is a high-level block diagram of an audio communications system according to an embodiment of the present invention.

FIG. 1 is a high-level block diagram of an audio communications system 100 according to an embodiment of the present invention. A plurality of terminals 110A-D are coupled to a switch 112 via communications links 114A-D. The terminal types can be heterogeneous or homogeneous.

In one embodiment, the terminals include: dedicated speakerphones, desktop handsets with or without speakerphone capabilities, cellular phones, and/or personal computer (PC) systems with audio capabilities. As used herein, the phrase "audio communications system" also includes video conferencing systems having audio capabilities. Each terminal 110, of which terminal 110A is representative, preferably includes a microphone 116A and a loudspeaker 118A. As is known in the art, the microphone 116 converts sound pressure waves into electrical signals and the loudspeaker 118 converts electrical signals into sound pressure waves.

The communications links 114 carry audio data representative of sounds picked up by the microphone 116 and to be played by the loudspeaker 118 to/from the switch 112. The communications links 114 may be wired or wireless. Moreover, the links 114 may include dedicated private links, shared links utilizing a publicly-accessible telephone network, and/or links using a public or private data communications network such as the Internet. Data traveling over the links 114 may pass through one or more switches or link types before reaching the switch 112 or terminal 110, although a preferred embodiment of the present invention treats a link passing through multiple links and switches as a single logical link. The data carried by the communications links 114 can be digital and/or analog. If the data is digital, it is preferably transmitted as a series of discrete data packets, such as Internet protocol (IP) packets. In one embodiment, the digital data is encoded into a compressed format.

The switch 112 switches and routes communications among the terminals. The switch 112 can be, for example, a private branch exchange (PBX) located at a business or other entity, a publicly-accessible switch operated by a telephone company or other entity providing audio communications, or an Internet server supporting Internet telephony. Thus, the term "switch" includes any device or combination of devices capable of providing the switching and other functionality attributed to the switch herein.

In one embodiment, the terminals 110 and/or switch 112 have one or more of the components found in a typical computer system, including a processing unit, random access memory (RAM), read-only memory (ROM), a storage device such as a hard drive, and/or other hardware and software for providing the functionality described herein. Aggregations of machine-executable code, data, circuitry, and/or data storage areas for performing a specific purpose or purposes are referred to as "modules." Different modules may share common code, data, and/or circuitry. The modules include, for example, signal processing modules, digital-to-analog (D/A) and analog-to-digital (A/D) converter modules, and amplifier modules. Modules may hold in their storage areas previous values of signals and current statistics derived therefrom. Modules can also use adaptive techniques, or training, to perform the modules' functionalities. As used herein, the terms "adaptation" and "training" are interchangeable and refer to acting on a signal responsive to previous values of that signal or other signals, statistics derived from the signals, and/or external controls or sensors.

Figure 2:
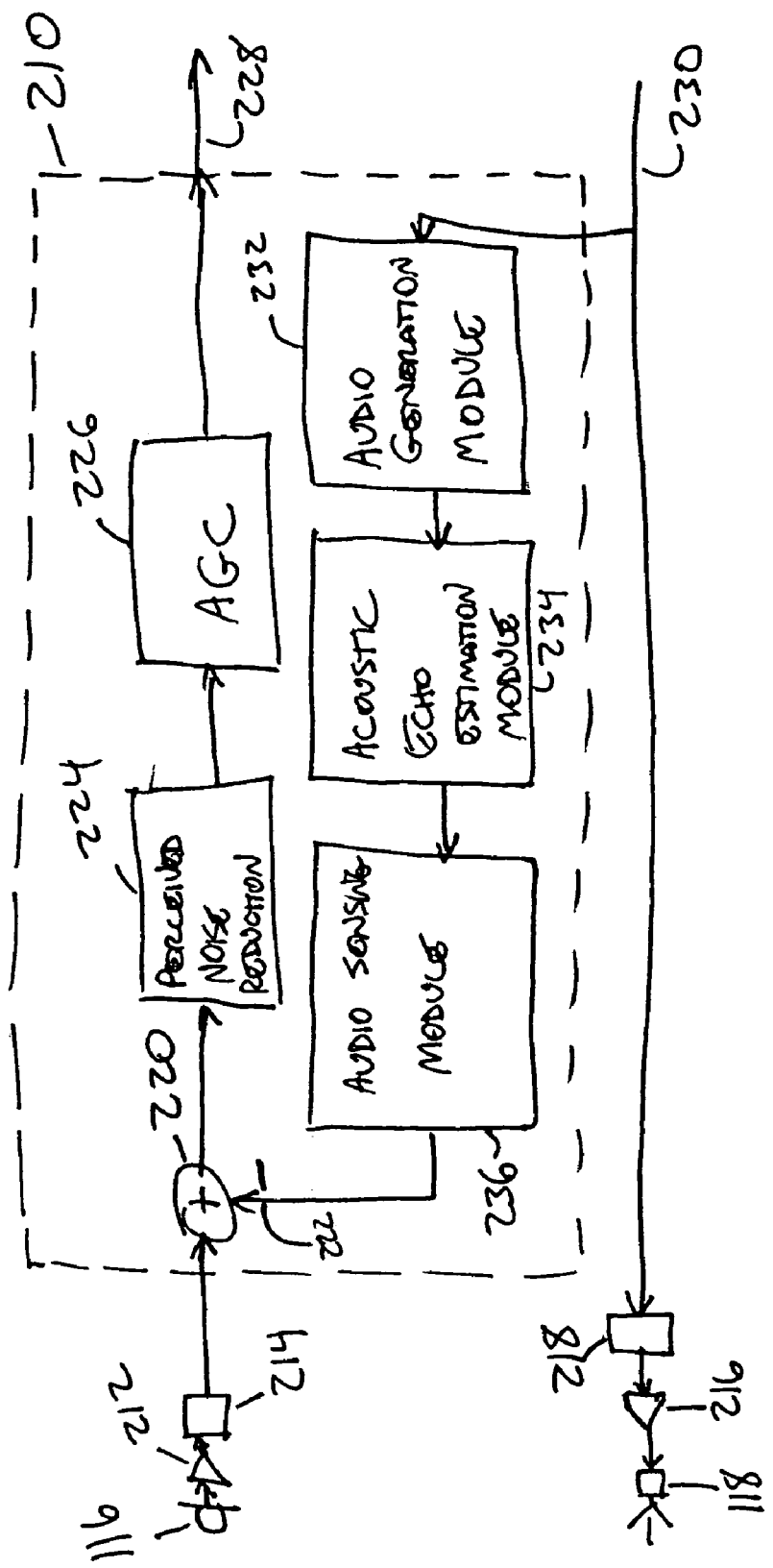
FIG. 2 is a block diagram illustrating various components of the audio communications system including an acoustic echo cancellation (AEC) module.

FIG. 2 is a block diagram illustrating various components of the audio communications system including an acoustic echo cancellation (AEC) module 210. FIG. 2 illustrates the microphone 116 of FIG. 1 having its output coupled to an amplifier 212. As is known in the art, the microphone 116 converts sound pressure waves into electrical signals. The amplifier 212 amplifies the electrical signals and provides its output to an A/D converter 214. The A/D converter 214 outputs digital sample values representative of the sound pressure waves to the AEC module 210.

FIG. 2 also illustrates the speaker 118 of FIG. 1. The speaker 118 generates sound pressure waves in response to an input received from an amplifier 216. The amplifier 216, in turn, is driven by the output of a D/A converter 218. The D/A converter 218 receives digital sample values representing the sound pressure waves as input from the link 114 or another source.

In general, the AEC module 210 estimates the echo of sounds played by the loudspeaker 118 that are picked up by the microphone 116, subtracts the estimated echo from the microphone's audio signal, and outputs the resulting echo-cancelled signal. In one embodiment, the AEC module 210 is located in the terminal 110. Accordingly, the output of the AEC module 210 is passed over the communications links 114 to the switch 112. In alternative embodiments, the AEC module 210 is located in the switch 112 or anywhere else that echo cancellation is desired and representations of the loudspeaker and microphone signals are available.

Turning to the AEC module 210 itself, the digital samples representing the audio signal sensed by the microphone output by the A/D converter 214 are received by an adder module 220. The adder module 220 also receives an input 222 providing digital samples representing the echo from the loudspeaker 118 estimated to be present in the microphone signal. The adder module 220 preferably adds the negative of the estimated echo to the signal received from the A/D converter 214. Preferably, the adder module 220 works on a sample-by-sample basis. In one embodiment, both the estimated echo samples received from the input 222 and the sample values received from the A/D converter 214 bear sequencing information that the adder module 220 uses to match the samples. U.S. patent application Ser. No. 09/660,205, incorporated by reference herein, discloses additional details related to the sequencing information.

The output of the adder module 220 is passed to a perceived noise reduction module 224. This module 224 preferable reduces perceived noise in the audio signal. Techniques for reducing perceived noise are well known in the art.

The output of the perceived noise reduction module is preferably passed to an automatic gain control (AGC) module 226. As is known in the art, the AGC module 226 preferably isolates times during which local speech is thought to be present in the input signal and adjusts the signal gain so that the speech is near a predetermined level when considered on average. The AGC module 226 can use adaptive techniques to perform AGC. The output 228 of the AGC module 226 is preferably provided to the switch 112 via the communications links 114 as described above.

The AEC module 210 also receives an input 230 carrying digital sample values representing the audio signal being sent to the loudspeaker 118 of the terminal 110. If the AEC module 210 is located in the terminal 110, then this input 230 is received from the switch 112 via the communications links 114. The loudspeaker 118 digital sample values are received by an audio generation module (AGM) 232 within the AEC module 210.

Figure 3:
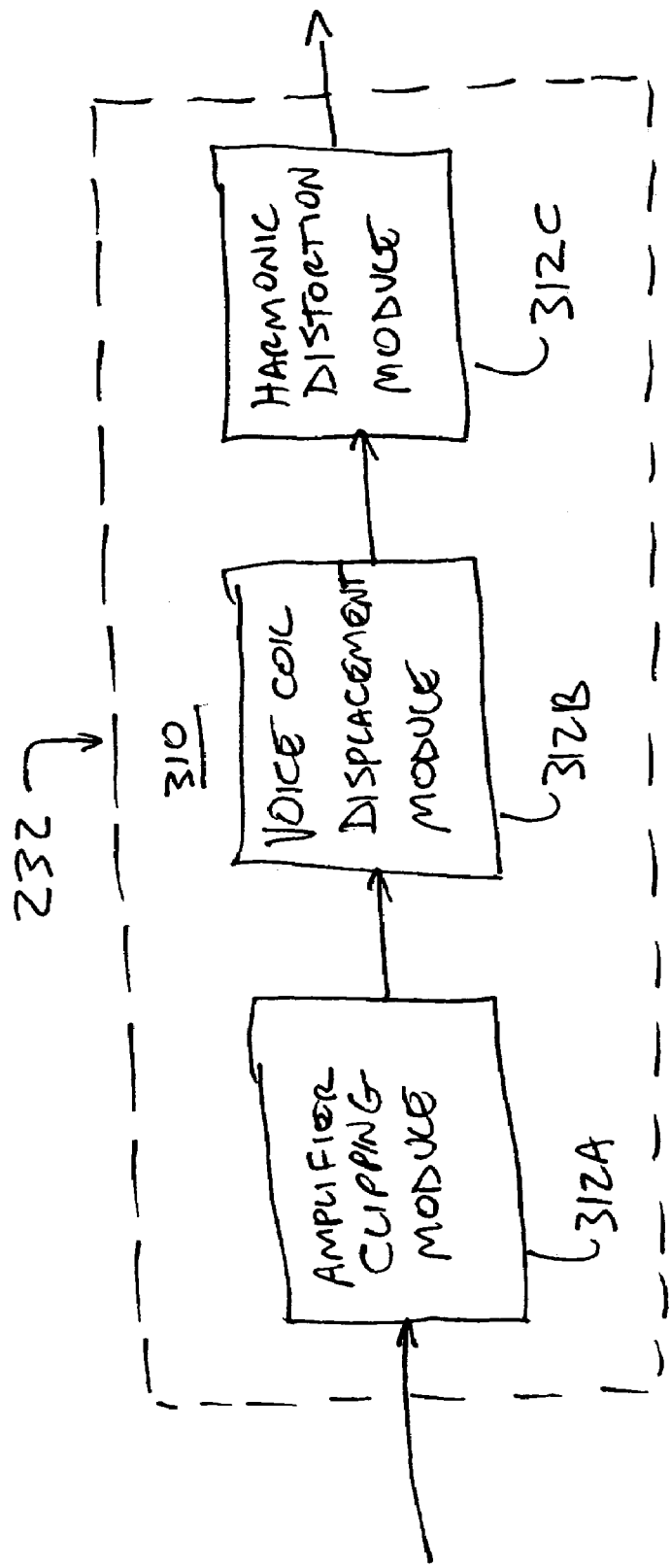
FIG. 3 is a lower-level view of an exemplary audio generation module in the AEC module.

The AGM 232 preferably modifies the digital sample values to model substantially nonlinear distortions that can occur during the process of generating the audio signal. FIG. 3 is a block diagram illustrating a lower-level view of the AGM 232 according to an exemplary embodiment of the present invention. The AGM 232 includes a modeling path 310 comprised of logical interconnects among one or more distortion modules 312 that operate on the digital samples traveling through the path. Each distortion module 312 receives digital samples as input, modifies the samples to model a form of distortion, and outputs the modified samples. Preferably, the AGM 232 can add or remove distortion modules from the modeling path 310 at any time in response to characteristics of the digital samples or under direction from other modules.

The AGM 232 preferably models effects which are substantially nonlinear. Certain embodiments utilize artificial neural networks (ANNs) to achieve adaptation. Those ANNs which are not adaptive may be present at the time of manufacture and do not require feedback for further adaptation. ANNs in adaptive modules 312 utilize internal and/or external feedback. Such feedback may be from other distortion modules 312, from the loudspeaker digital signal, and/or from the microphone signal before or after the adder module 220. These many possible feedback paths have been omitted from the modeling path 310 in FIG. 3 in order to clarify the teachings of the present invention.

The example of a modeling path 310 illustrated in the AGM 232 of FIG. 3 has three distortion modules 312A, 312B, 312C arranged in sequence. Each distortion module 312 preferably contains a filter or other operator that acts on the input samples. The module 312 can be adaptive or it can be partly or wholly pre-established. Likewise, the module 312 can operate in the time or frequency domains. The module 312 can also act in response to short or long-term signal characteristics to model effects such as heat build-up.

Preferably, each distortion module 312 independently models a form of distortion. In FIG. 3, the first distortion module 312A models amplifier clipping by enforcing a hard limit on signal amplitudes. Thus, this distortion module 312A models the effects of the speaker amplifier 216 in the terminal 110 on the analog signal sent to the loudspeaker 118. The second distortion module 312B models loudspeaker 118 voice coil (or equivalent structure) displacement. In one embodiment, this distortion module 312B estimates the nonlinear relationship between the voice coil displacement and the driving current. In one embodiment, the driving current estimate received by the voice coil displacement module 312B is generated by the amplifier clipping module 312A and so may be a nonlinear representation of the loudspeaker digital samples. The third distortion module 312C models harmonic distortion introduced by the loudspeaker 118. In one embodiment, this distortion module 312C applies harmonic distortion with a strength modulated by the energy in the spectral components subject to the distortion. Thus, this distortion module 312C mimics the operation of a loudspeaker 118 driven with high electrical amplitudes where diaphragms distort and resonate. Other distortion modules 312 that may be utilized in the modeling path 310 include modules that account for distortions introduced by the D/A conversion module 218 and modules that account for hysterisis in iron core inductors.

In one embodiment of the present invention, the distortion modules 312 are tailored to model the distortions introduced by specific types of hardware. For example, if the AGM 232 is located in the terminal 110, the amplifier clipping 310A and voice coil displacement 310B modules can be specifically tailored for the amplifiers and voice coils included in the terminal 110.

The AGM 232 outputs digital sample values representing the distorted audio signal to an acoustic echo estimation (AEE) module 234. The AEE module 234 preferably uses adaptive algorithms to adapt the digital samples to compensate for substantially linear changes in the echo characteristics of the environment in which the loudspeaker 118 and microphone 116 are located. For example, the AEE module 234 can modify the digital samples to account for changes in echo attenuation due to relocation of people in the vicinity of the microphone 116.

The digital sample values output by the AEE module 234 are preferably received by an audio sensing module (ASM) 236. The ASM 236 preferably modifies the digital sample values to model distortions that can occur in the process of sensing the audio signal. Like the AGM 232, the ASM 236 preferably includes a modeling path comprised of logical interconnects among one or more distortion modules. The modeling path for the ASM 236 is not shown in the figures because it would be redundant in view of FIG. 3. Also like the AGM 232, the ASM 236 preferably models substantially nonlinear distortions. Unlike the AGM 232, the ASM preferably models distortions such as microphone 116 center-clipping, amplifier zero crossing distortion, saturation in either the microphone or the amplifier, and/or distortions introduced by the A/D converter 214. The output of the ASM 236 is provided to the adder module 220 and becomes the input signal representing the echo from the loudspeaker 118 estimated to be present in the microphone signal described above.

Accordingly, the AEC module 210 of the present invention accurately models the effects of distortion on the audio signals. The modeled types of distortion include nonlinear distortions introduced while generating and sensing the audio signal and linear echoes introduced responsive to room characteristics. This distortion modeling enables the AEC to more accurately cancel the echo in the signal received from the microphone 116.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. An audio communication device, comprising:
   a first audio signal input for receiving a first audio signal;
   a second audio signal input for receiving a second audio signal, wherein at least a portion of the second audio signal is an echo of the first audio signal;
   an echo cancellation device, including
      a subtractor having two inputs and one output, and configured to subtract signals presented on the two inputs to remove the echo and to output a subtracted signal on the subtractor output, the first subtractor input being connected to the first audio signal output,
      a noise reducer having an input connected to the subtractor output, and having an output,
      an auto gain control having an input connected to the noise reducer output,
      an audio sensing filter having an output connected to the subtractor second input, and having an input, the audio sensing module configured to compensate for distortions caused by sensing the first audio signal,
      an acoustic echo estimation filter having an output connected to the audio sensing module input, and having an output, said acoustic echo estimator configured to compensate for substantially linear changes in echo characteristics, and
      an audio generation filter having an output connected to the acoustic echo estimator input, and having an input connected to the second audio signal input, the audio generator configured to remove substantially nonlinear distortions associated with the formation of the first audio signal.

2. The device of claim 1, wherein the audio generation filter comprises:
   an amplifier clipper;
   a voice coil displacement filter; and
   a harmonic distortion filter.

3. A method of canceling an echo in an audio signal, comprising the steps of
   receiving a first audio signal;
   receiving a second audio signal, wherein at least a portion of the second audio signal is an echo of the first audio signal; and
   cancelling said echo, including
      subtracting signals presented on two inputs to remove the echo and to output a subtracted signal, the signal on one of said two inputs being related to the first audio signal, and the signal on the other of said two inputs being related to said second audio signal,
      reducing noise in said subtracted signal,
      performing auto gain control on the noise reduced subtracted signal, and outputting the gain controlled, noise reduced subtracted signal,
      modifying digital samples corresponding to said second audio signal to remove substantially nonlinear distortions associated with the formation of the first audio signal, and outputting a first modified signal,
      modifying said first modified signal to compensate for substantially linear changes in echo characteristics to produce a second modified modeled signal,
      modifying the second modified modeled signal to compensate for distortions caused by sensing the first audio signal, and outputting a third modified signal as said signal on the other of said two inputs being related to said second audio signal.

4. The method of claim 3, wherein the step of modifying digital samples corresponding to said second audio signal to remove substantially nonlinear distortions comprises the step of:
   filtering with an amplifier clipper;
   filtering with a voice coil displacement filter; and
   filtering with a harmonic distortion filter.

* * * * *